(12) United States Patent
Carpenter

(10) Patent No.: US 11,427,078 B2
(45) Date of Patent: Aug. 30, 2022

(54) ADJUSTABLE TRANSMISSION MOUNT

(71) Applicant: ADVANCED RESOURCES, LLC, Akron, OH (US)

(72) Inventor: David Carpenter, West Salem, OH (US)

(73) Assignee: ADVANCED RESOURCES, LLC, Akron, OH (US)

(*) Notice: Subject to any disclaimer, the term of this patent is extended or adjusted under 35 U.S.C. 154(b) by 46 days.

(21) Appl. No.: 17/248,662

(22) Filed: Feb. 2, 2021

(65) Prior Publication Data
US 2021/0237565 A1 Aug. 5, 2021

Related U.S. Application Data

(60) Provisional application No. 62/969,910, filed on Feb. 4, 2020.

(51) Int. Cl.
*B60K 17/00* (2006.01)
*F16M 13/02* (2006.01)

(52) U.S. Cl.
CPC ........... *B60K 17/00* (2013.01); *F16M 13/022* (2013.01)

(58) Field of Classification Search
CPC ........ B60K 17/00; B60K 20/04; B60K 20/08; F16M 13/022
USPC .................................................. 180/312, 377
See application file for complete search history.

(56) References Cited

U.S. PATENT DOCUMENTS

| | | | |
|---|---|---|---|
| 5,044,813 A | 9/1991 | Gregg | |
| 5,174,541 A | 12/1992 | Hutter et al. | |
| 5,251,865 A * | 10/1993 | Kelly | B60K 17/00 267/141.5 |
| 5,305,847 A | 4/1994 | Mefford | |
| 5,551,661 A | 9/1996 | Bunker | |
| 5,788,206 A | 8/1998 | Bunker | |
| 5,788,207 A | 8/1998 | Bunker | |
| 6,397,701 B1 * | 6/2002 | Park | B62D 3/12 280/775 |
| 7,789,189 B2 | 9/2010 | Bigg et al. | |
| 9,816,599 B2 * | 11/2017 | Compton | F16H 57/025 |
| 2006/0202099 A1 * | 9/2006 | Stribling | B60K 17/00 248/544 |
| 2019/0056023 A1 * | 2/2019 | Lee | F16F 1/3713 |
| 2019/0078366 A1 * | 3/2019 | Lu | B60J 5/0418 |

* cited by examiner

*Primary Examiner* — Jonathan Ng
*Assistant Examiner* — Scott F. Underwood
(74) *Attorney, Agent, or Firm* — Vorys, Sater, Seymour and Pease LLP; Mark A. Watkins, Esq.

(57) ABSTRACT

A transmission-mount assembly includes a transmission-mounting bracket and a frame-mounting bracket. The frame-mounting bracket includes a pair of sidewalls and the transmission-mounting bracket includes a tube, where the transmission-mounting bracket is coupled to the frame-mounting bracket with the tube arranged between the sidewalls. A bolt may be inserted through channels configured in the sidewalls and a bore of the tube to couple the transmission-mounting bracket within the frame-mounting bracket. The channels may include one or more features to inhibit misalignment and facilitate establishment of a positive lock between the transmission-mounting bracket and the frame-mounting bracket.

13 Claims, 4 Drawing Sheets

ADJUSTABLE TRANSMISSION MOUNT

CROSS-REFERENCE TO RELATED APPLICATIONS

This patent application claims priority to and the benefit of pending provisional patent application 62/969,910 filed on Feb. 4, 2020, which is incorporated by reference herein in its entirety

BACKGROUND

Automotive transmissions (hereinafter, "transmission") may be changed for a number or reasons. For example, it may be desirable to remove a standard transmission and replace it with an automatic transmission, or vice versa. It may also be desirable to replace a traditional or conventional automatic transmission with a new generation automatic transmission, such as, an electronic shift controlled transmission, an overdrive transmission, a continuously variable transmission, a dual-clutch transmission, a direct shift gearbox, a tiptronic transmission, etc.

Transmissions may be installed in a vehicle by mounting them on a cross-arm attached to a frame of the vehicle. Transmissions have various lengths, and people will find that after performing a transmission swap, they may be off one (1) to two (2) inches, which is not uncommon. This off-set, however, may impair structural integrity. Therefore, transmission mounts with adjustability to accommodate such offsets is desirable. However, currently available transmission mounts are subject to misalignment when adjusted to account for such offsets. Furthermore, the various components or brackets of currently available transmission mounts are not always securely locked together after being expanded or contracted to account for such offset, and such lack of a positive lock may further impair structural integrity. Therefore, a need exists for an adjustable transmission mount that inhibits misalignment and may more easily establish a positive lock.

SUMMARY

Disclosed herein is a transmission mount assembly, comprising: a transmission-mounting portion comprising a plate and a tube provided on a bottom surface of the plate, the tube having a bore for receiving a fastener; a frame-mounting portion comprising a bracket having a pair of sidewalls between which the tube is provided, the sidewalls extending from an inner surface of the frame-mounting portion and each having a corresponding channel for receiving the fastener, the transmission-mounting portion being movably connected to the frame-mounting portion when the fastener is extended through the channels and the bore, wherein each channel includes features corresponding with the features of the opposite channel and configured to retain the fastener and, thereby the tube, at a selected position along a length of the corresponding channels. In some embodiments, the features of the transmission mount assembly comprise a series of serrations. In some embodiments, the features are configured to inhibit misalignment and establish a positive lock between the frame-mounting portion and the transmission-mounting portion. In some embodiments, the transmission-mounting portion of the transmission mount assembly is adjustable within the channels of the frame-mounting portion to account for misalignment there-between. In some embodiments, the tube of the transmission mount assembly is coupled to the plate via one or more plugs. In some embodiments, the plate of the transmission mount assembly includes a pair of beveled corners adjacent to a front edge of the plate. In some embodiments, the tube includes a first end positionable proximate to an inner surface of a first of the sidewalls and a second end positionable proximate to an inner surface of a second of the sidewalls, and the transmission mount assembly further comprises a first bushing provided between the first end of the tube and the first sidewall and a second bushing provided between the second end of the tube and the second sidewall. In some embodiments, the transmission-mounting portion is rotatable relative to the frame-mounting portion about an axis defined by the fastener. In some embodiments, the transmission-mounting portion is slidable relative to the frame-mounting portion in a plane defined along a length of the corresponding channels. In some embodiments, the transmission-mounting portion and the frame-mounting portion are movable relative to each other about an axis defined by the fastener and/or in a plane defined along a length of the corresponding channels. In some embodiments, the corresponding channels each have a lower edge and an upper edge, the lower edge corresponding with the inner surface of the frame-mounting portion and the upper edge being disposed opposite the lower edge, and wherein the features are provided on a lower edge of each of the corresponding channels. In some embodiments, the corresponding channels each have a lower edge and an upper edge, the lower edge corresponding with the inner surface of the frame-mounting portion and the upper edge being disposed opposite the lower edge, and wherein the features are provided on an upper edge of each of the corresponding channels. In some embodiments, the corresponding channels each have a lower edge and an upper edge, the lower edge corresponding with the inner surface of the frame-mounting portion and the upper edge being disposed opposite the lower edge, and wherein the features are provided on both an upper edge and lower edge of each of the corresponding channels.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to vehicle mounting devices and, more particularly, to a mounting device that is adjustable to accommodate varying types of vehicle transmissions and different sized vehicle frames.

The embodiments described herein provide a transmission mount with a transmission-mounting bracket (or portion) and a frame-mounting bracket (or portion) that are movable relative to each other, such that the transmission mount is adjustable to account for drivetrain misalignments, and thereby facilitate installation of a transmission on a vehicle. Other embodiments described herein provide channels in the frame-mounting bracket utilizable in an adjustable transmission-mount assembly to inhibit misalignment and establish a positive lock between the frame-mounting bracket and the transmission-mounting bracket.

Figure 1A:
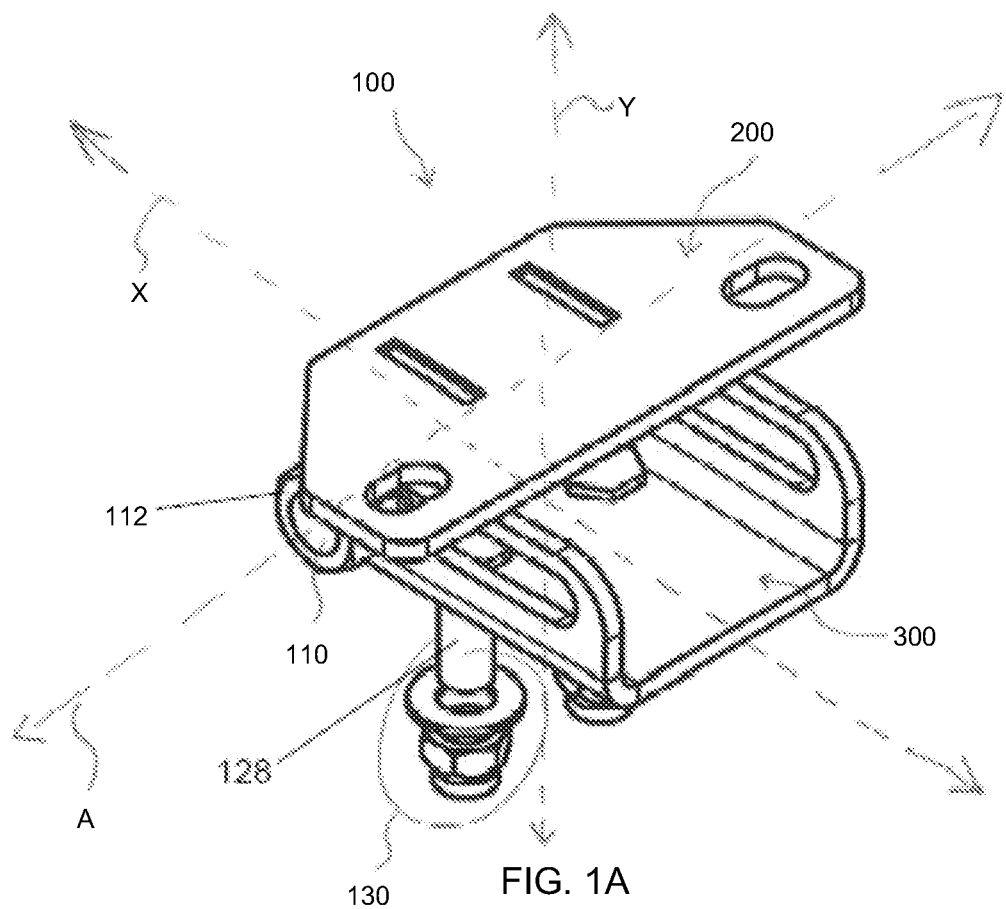
FIG. 1A is an isometric view of an example adjustable transmission-mount assembly that may incorporate the principles of the present disclosure.
Figure 1B:
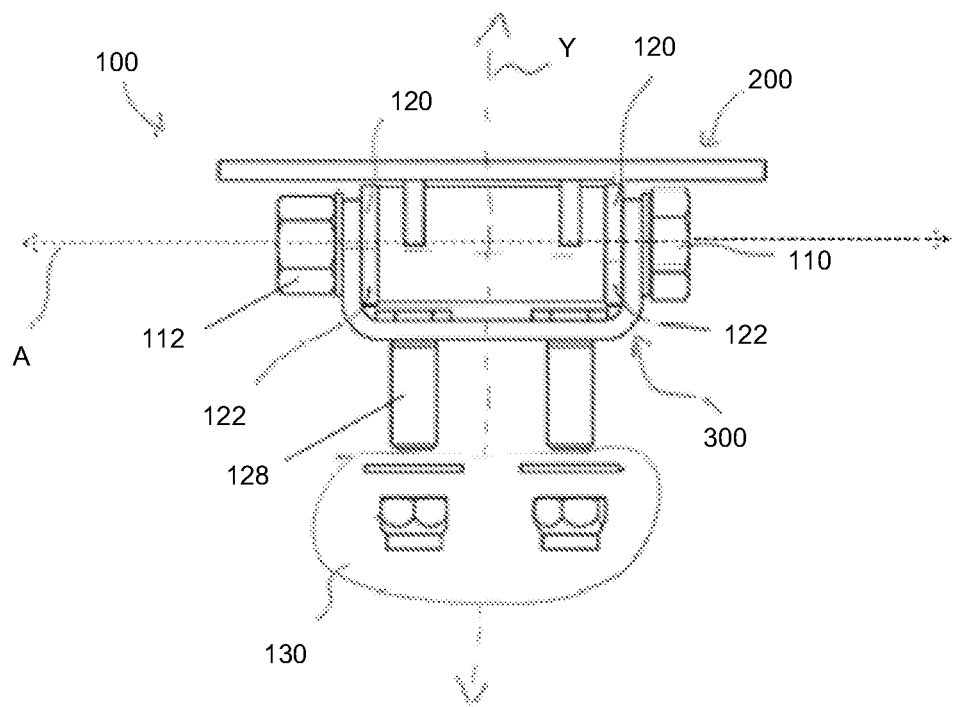
FIG. 1B is a side view of the adjustable transmission-mount assembly of FIG. 1A.

FIG. 1A is an isometric view of an example adjustable transmission mount 100 (hereinafter, the "transmission mount 100") that may incorporate the principles of the present disclosure. FIG. 1B is a side view of the adjustable transmission-mount assembly of FIG. 1A. The depicted transmission mount 100 is just one example transmission-mounting assembly that can suitably incorporate the principles of the present disclosure. Indeed, many alternative designs and configurations of the transmission mount 100 may be employed, without departing from the scope of this disclosure.

The transmission mount 100 includes several portions or sub-assemblies. As illustrated, the transmission mount 100 includes a transmission-mounting sub-assembly 200 (or portion) and a frame-mounting sub-assembly 300 (or portion). The transmission-mounting sub-assembly 200 is configured to secure the transmission mount 100 to a transmission housing (not illustrated), whereas, the frame-mounting sub-assembly 300 is configured to secure the transmission mount 100 to a vehicle frame (not illustrated). In some examples, the frame-mounting sub-assembly 300 is configured to attach to a cross-member or cross-arm (not illustrated) of the vehicle frame. The transmission-mounting sub-assembly 200 and the frame-mounting sub-assembly 300 may be made from various materials, including without limitation, various types of steel, aluminum, polyurethane, etc.

The transmission-mounting sub-assembly 200 and the frame-mounting sub-assembly 300 may be movably connected to each other, such that they may move relative to one another. For example, the transmission-mounting sub-assembly 200 and the frame-mounting sub-assembly 300 may be rotatably and or slidably connected to each other such that they may rotate and/or slide relative to each other about an axis and/or within a plane. The transmission-mounting sub-assembly 200 and the frame-mounting sub-assembly 300 may be movably connected to each other via a variety of attachment/connection means, such as a fastener or other means. In the illustrated embodiment, a bolt 110 and lock nut 112 are utilized to secure the transmission-mounting sub-assembly 200 and the frame-mounting sub-assembly 300 together; however, other attachment means may be utilized without departing from the present disclosure. Here, the transmission-mounting sub-assembly 200 and the frame-mounting sub-assembly 300 may rotate relative to each other about an axis A of the bolt 110, and such rotation (at least in part) provides the transmission mount 100 with adjustability, such that the transmission mount 100 is adjustable and/or may be utilized in various end-use applications where the transmission housing mounting location is not parallel to the vehicle frame-mounting portion. The transmission-mounting sub-assembly 200 and the frame-mounting sub-assembly 300 may also slide relative to each other, and such relative sliding movement may provide the transmission mount 100 with even greater adjustability. As further described, the transmission-mounting sub-assembly 200 and the frame-mounting sub-assembly 300 may also slide relative to each other within a plane through which the bolt 110 extends. When the bolt 110 and lock nut 112 are tightened to the specified torque, relative movement (i.e., rotation about the axis A and translation in a plane) may be inhibited, whereas, such relative movement may be permitted when loosened.

The transmission mount 100 also includes one or more bushings 120 arranged between the transmission-mounting sub-assembly 200 and the frame-mounting sub-assembly 300. In the illustrated embodiment, the transmission mount 100 includes a pair of the bushings 120; however, a single bushing or more than two of the bushings 120 may be utilized without departing from the present disclosure. As discussed below, the bushings 120 each interpose neighboring portions of the transmission-mounting sub-assembly 200 and the frame-mounting sub-assembly 300, and the bushings 120 are squeezed there-between when the bolt 110 and the lock nut 112 (or other locking mechanisms) are tightened. In this regard, the bushings 120 provide friction between the transmission-mounting sub-assembly 200 and the frame-mounting sub-assembly 300, and act to absorb vibration while permitting slight relative movement there-between. In the illustrated embodiment, the bushings 120 are made from an 85 durometer polyurethane; however, other materials may be utilized and/or other types of bushings 120 may be incorporated. In some examples, more than just one bushing 120 is provided at each illustrated bushing location.

The transmission mount 100 may be secured to the transmission housing and/or the vehicle frame via a variety of manners. In some examples, hardware such as mechanical fasteners are utilized to secure the transmission mount 100 to the transmission housing and/or to the vehicle frame. Other attachment means, such as welding, may be utilized, in addition to or in lieu of the foregoing, to secure the transmission mount 100. In the illustrated example, the frame-mounting sub-assembly 300 is configured to be secured to the cross-members of the vehicle frame via a set lock nuts 128 and washers 130. The transmission-mounting sub-assembly 200 may be secured to the transmission housing in a variety of manners too. For example, threaded fasteners such as bolts (not illustrated) may be utilized and threaded into corresponding threaded apertures (not illustrated) in the transmission housing.

Figure 2A:
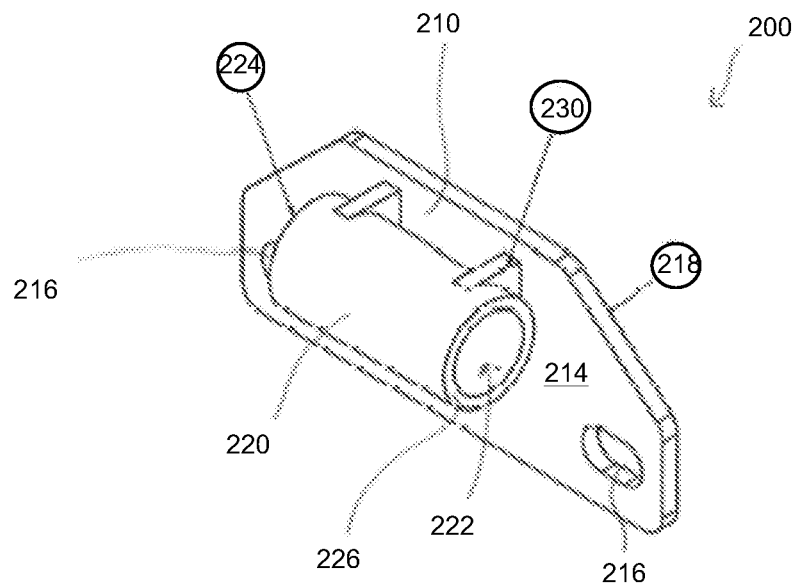
FIG. 2A is a perspective bottom view of an example transmission-mounting bracket of the adjustable transmission-mount assembly illustrated in FIG. 1A.
Figure 2B:
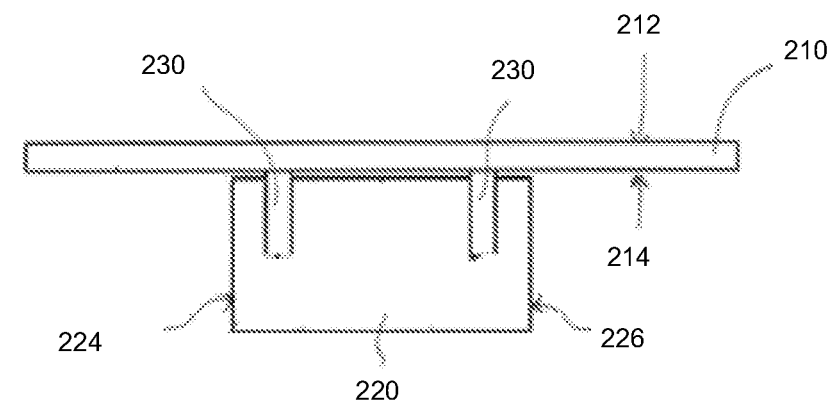
FIG. 2B is a side view of the transmission-mounting bracket of FIG. 2A.
Figure 2C:
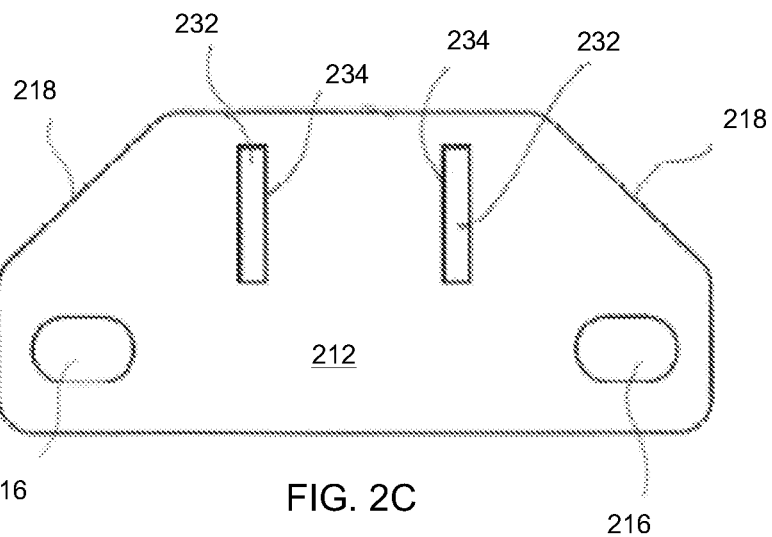
FIG. 2C is a top view of the transmission-mounting bracket of FIG. 2A.

FIGS. 2A-2C illustrate the transmission-mounting sub-assembly 200 according to one or more embodiments of the present disclosure. In particular, FIG. 2A is a perspective bottom view of the transmission-mounting sub-assembly 200, FIG. 2B is a side view of the transmission-mounting sub-assembly 200, and FIG. 2C is a top view of the transmission-mounting sub-assembly 200.

As illustrated, the transmission-mounting sub-assembly 200 includes a plate 210 and a tube 220. The plate 210 includes a top surface (or mounting surface) 212 and a bottom surface (or tube mounting surface) 214. The plate 210 is configured to be secured to the transmission housing, with the top surface 212 being secured against a corresponding mating surface of the transmission housing. Thus, the plate 210 may be configured to be attached to the transmission housing. Here, for example, the plate 210 includes a pair of apertures 216 configured to receive a fastener (not shown) that is driven into the transmission housing; however, the plate 210 may include more or less than the pair of apertures 216, and the plate 210 may even be differently configured depending on the manner in which the plate 210 is to be secured proximate to the transmission housing. As mentioned, the plate 210 will be secured proximate to the transmission housing. Accordingly, it may be appropriately dimensioned to correspond with one or more mating surfaces of the transmission housing. In the illustrated embodiment, the plate 210 includes a pair of beveled corners 218. The beveled corners 218 reduce the overall weight of the transmission mount 100, and the beveled corners 218 also ensure that the transmission-mounting sub-assembly 200 is mountable on a wide variety of differently shaped transmission housings as they may provide more play or slop between the plate 210 and the transmission housing.

The tube 220 is hollow and thus includes a bore 222 that extends through the tube 220, from a first end 224 thereof to a second end 226 thereof. The bore 222 of the tube 220 is configured to receive the bolt 110, which in turn will constrain the frame-mounting sub-assembly 300 to the transmission-mounting sub-assembly 200 when assembled. In the illustrated embodiment, a first of the bushings 120 is arranged at the first end 224 of the tube 220 and a second of the bushings 120 is similarly arranged at the second end 226 thereof. In other embodiments, a single bushing is utilized that extends through the bore 222 and protrudes outward thereof at the first end 224 and the second end 226 as illustrated in FIG. 1B. Here, however, the bushings 120 include a bore portion (obscured from view in FIG. 1B) that is press fit (and/or adhesively secured) within the bore 222 and a flange portion 122 that is arranged outside of the bore 222 at locations proximate to the first end 224 and the second end 226 of the tube 220. In such embodiments, it is the flange portion 122 of the bushing 120 that is squeezed or compressed between the tube 220 of the transmission-mounting sub-assembly 200 and (an inner surface of) the frame-mounting sub-assembly 300 when assembled together and tightened together, for example, when torque is applied to the bolt 110 and lock nut 112.

In addition, the plate 210 may include one or more additional apertures for securing the tube 220 to the plate 210 as described hereinafter. In the illustrated embodiment, the tube 220 is attached to the bottom side 214 of the plate 210 via a pair of mounting plugs 230. Here, the mounting plugs 230 each include a plug portion 232 that extends through a correspondingly sized aperture 234 in the plate 210. The aperture 234 may be laser cut in the plate 210 or formed via other processes. Also, the plug portions 234 of the mounting plugs 230 may be fuse or plug welded at the top surface 212 of the plate 210, whereas the plug portions 232 (or the remaining portion of the mounting plugs 230) may be ring welded to the bottom surface 214 of the plate. Positioning the plug portions 232 of the mounting plugs 230 in the corresponding apertures 234 is optional, and the mounting plugs 230 may be differently configured to interconnect the plate 210 and the tube 220. However, attaching the tube 220 to the plate 210 via positioning the plug portions 232 of the mounting plugs 230 in the corresponding apertures 234 provides positive positioning of the tube 220 relative to the 210, which ensures proper alignment therebetween and may improve overall strength of the connection. Attaching the tube 220 to the plate 210 with the mounting plugs 230 is optional, however, and the tube 220 may differently attached to the plate 210. For example, a single mounting plug may be utilized, and such single mounting plug may be similarly or differently configured than the mounting plug 230. In even other examples, the tube 220 may be directly attached to the plate 210.

Figure 3A:
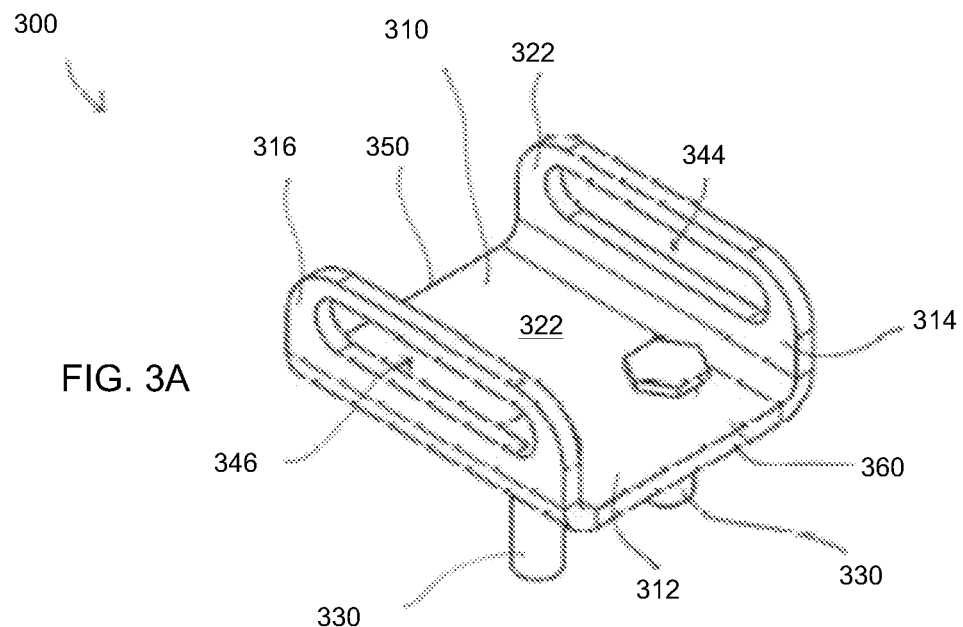
FIG. 3A is a perspective top view of an example frame-mounting bracket of the adjustable transmission-mounting assembly illustrated in FIG. 1A.
Figure 3B:
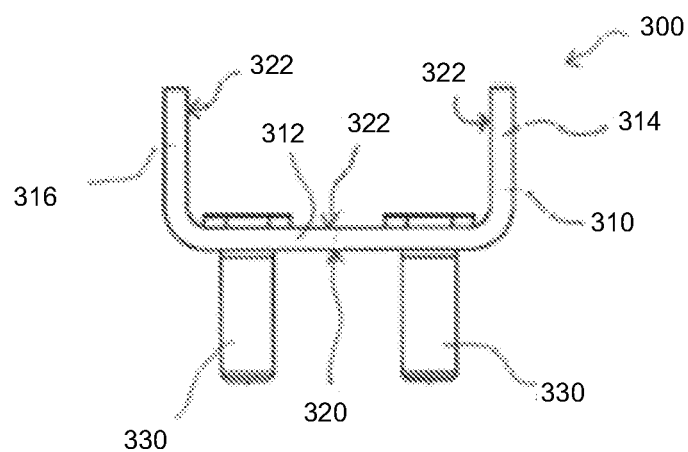
FIG. 3B is a side view of the frame-mounting bracket of FIG. 3A.

FIGS. 3A and 3B illustrate the frame-mounting sub-assembly 300 according to one or more embodiments of the present disclosure. In particular, FIG. 3A is a perspective top view of the frame-mounting sub-assembly 300, whereas FIG. 3B is a side view thereof. The frame-mounting sub-assembly 300 includes a plate 310. In the illustrated example, the plate 310 is "C" shaped and thus includes a base 312 with a pair of sidewalls 314,316 arranged at opposing ends of the base 312. Here, the sidewalls 314,316 extend substantially perpendicular to the base 312, but they may be oriented at different angles relative to the base 312.

The plate 310 includes a mounting surface 320 and an inner surface 322. As previously discussed, the mounting surface 320 will be positioned proximate to a cross-member or cross-arm (not illustrated) when the mount 100 is secured to the vehicle frame. The inner surface 322 extends over the base 312 and also extends over the pair of sidewalls 314,316, and the inner surface 322 contacts an outer surface (obscured from view) the flange portion 122 of the bushing 120 when the transmission-mounting sub-assembly 200 is arranged within the frame-mounting sub-assembly 300 and torque is applied to the bolt 110 and lock nut 112.

As illustrated, one or more threaded fasteners 330 extend from the mounting surface 320 of the plate 312, and are configured for securing the mount 100 to the vehicle frame. Here, a pair of the threaded fasteners 330 are utilized, however, more or less may be utilized instead.

The bolt 110 and the lock nut 112 are utilized to secure (and tighten together) the transmission-mounting sub-assembly 200 arranged within the frame-mounting sub-assembly 300. As previously mentioned, the bolt 110 is inserted through the tube 220 of the transmission-mounting sub-assembly 200. To secure the frame-mounting sub-assembly 300 to the tube 220 of the transmission-mounting sub-assembly 200, however, the frame-mounting sub-assembly 300 is also configured to receive the bolt 110. In the illustrated example, a pair of channels 344,346 are disposed in the pair of sidewalls 314,316, respectively, and the channels 344,346 are configured such that the bolt 110 may be inserted therethrough. Thus, the bolt 110 may be inserted through the (first) channel 344, through the (first) bushing 120, through the tube 220, through the (second) bushing 120, and then through the (second) channel 346; and then the lock nut 112 may be threaded over the bolt 110 to tighten together the transmission-mounting sub-assembly 200 and the frame-mounting sub-assembly 300. Various amounts of torque may be applied to the bolt 110 to tighten the transmission-mounting sub-assembly 200 and the frame-mounting sub-assembly 300 together, though, the amount of torque to be applied may depend on the material utilized to form the one or more bushings 120, as excessive torque may cut or otherwise rupture the one or more bushings 120.

As previously mentioned, the mount 100 is adjustable. Thus, the transmission-mounting sub-assembly 200 and the frame-mounting sub-assembly 300 are configured to move relative to each other to account for drivetrain misalignments. Here, for example, the transmission-mounting sub-assembly 200 and the frame-mounting sub-assembly 300 are configured to slide relative to each other and to rotate relative to each other. In the illustrated example, the channels 344,346 are oriented along an axis X, which is approximately parallel to the base 312. Thus, the illustrated channels 344,346 are configured to permit relative sliding movement (i.e., in a plane of the axis X) between the transmission-mounting sub-assembly 200 and the frame-mounting sub-assembly 300. This relative sliding movement enables the mount 100 to be adjusted front to back as needed to account for drivetrain misalignment that may result during transmission replacement. This relative sliding also enables the mount 100 to be utilized with various types of replacement transmissions and vehicle frames where dimensions may not always be uniform and/or where such replacement may result in misalignment. The length of the channels 344,346 defines the amount of travel between the transmission-mounting sub-assembly 200 and the frame-mounting sub-assembly 300, and in some examples, the channels 344,346 are dimensioned to permit up to two and one half inches (2.5") of offset, either forward or rearward along the axis X, between the transmission-mounting sub-assembly 200 and the frame-mounting sub-assembly 300.

As mentioned, the mount 100 is configured to permit relative rotation between the transmission-mounting sub-assembly 200 and the frame-mounting sub-assembly 300, for example, about the axis A of the bolt 110. In addition, the mount 100 is also adjustable as the transmission-mounting sub-assembly 200 may be differently arranged within the frame-mounting sub-assembly 300. In FIG. 1A, the transmission-mounting sub-assembly 200 is arranged within the frame-mounting sub-assembly 300 such that the beveled corners 218 of the plate 210 are oriented in the same direction as a first edge 350 of the plate 310. In other embodiments, however, the transmission-mounting sub-assembly 200 may be oppositely arranged within the frame-mounting sub-assembly 300 such that the beveled corners 218 of the plate 210 are oriented in the same direction as a second edge 360 of the plate 310. For example, the bolt 110 may be removed, thereby permitting removal of the transmission-mounting sub-assembly 200 from the frame-mounting sub-assembly 300, and then the transmission-mounting sub-assembly 200 may be rotated one-hundred and eighty degrees (180°) about an axis Y (that is normal to the axis A). Thereafter, the transmission-mounting sub-assembly 200 may be re-assembled within the plate 310 of the frame-mounting sub-assembly 300 and the bolt 110 may be re-inserted through the channels 344,346 and the tube 220 (and tightened, for example, with the lock nut 112), thereby securing together the transmission-mounting sub-assembly 200 and the frame-mounting sub-assembly 300.

Figure 4A:
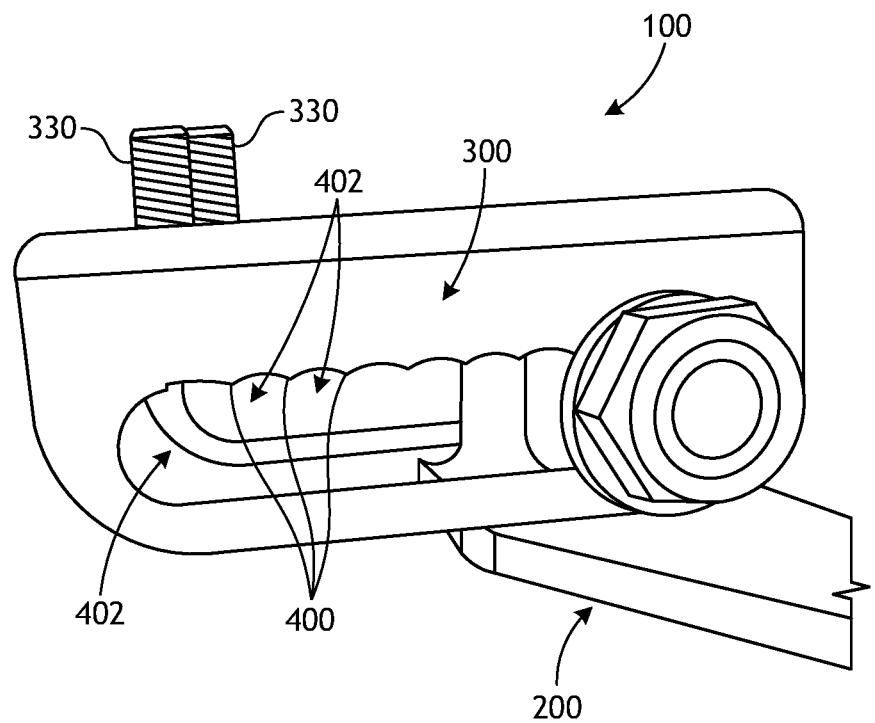
FIGS. 4A and 4B illustrate an exemplary channel of the transmission-mounting bracket of FIGS. 3A-3B, according to one or more examples.
Figure 4B:
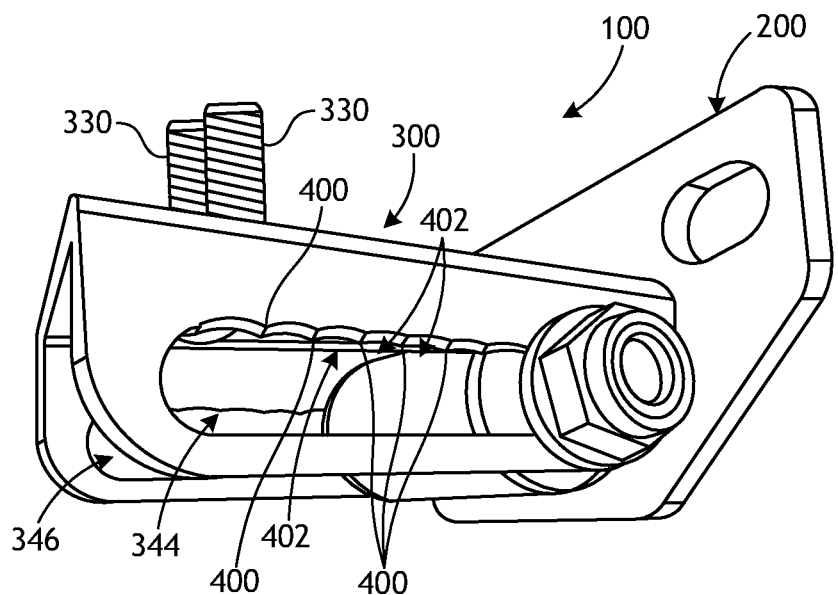

Misalignment between the transmission-mounting sub-assembly 200 and the frame-mounting sub-assembly 300 may sometimes occur. In addition, relative movement along the axis X (in the form of slipping) between the transmission-mounting sub-assembly 200 and the frame-mounting sub-assembly 300 may occur even when they are tightened together by applying an appropriate amount of torque to the bolt 110. Thus, the channels 344,346 may be configured to inhibit misalignment (even when the bolt 110 is properly torqued) and ensure a positive lock is established and maintained between the transmission-mounting sub-assembly 200 and the frame-mounting sub-assembly 300. FIGS. 4A and 4B illustrate an example of the channels 344,246 configured to inhibit misalignment and configured to facilitate (or establish) such positive lock, according to various embodiments.

In FIGS. 4A and 4B, the channels 344,346 each include features 400 that define discrete positions 402 through which the bolt 110 may be inserted. In the illustrated example, the features 400 are defined on an upper edge 404 of the channels 344,346; however, in other examples, the features may be arranged on a lower edge 406 of the channels 344,346, or on both the upper edge 404 and the lower edge 406. Also in the illustrated example, the features 400 are configured as serrations, but in other examples, may be arranged with other geometries or combinations of different geometries. In some examples, the features 400 are configured to correspond to the shape of the bolt 110. Thus, if the bolt 110 is circular in cross-section, the features 400 may be define at least semi-circular positions 402, or, if the bolt 110 has a different cross-section, the features 400 may be correspondingly shaped to receive the bolt 110 that is so configured. For example, the features may be provided to define slots with square or rectangular shapes (or various polygonal shapes), which may thereby receive correspondingly square or rectangularly shaped (or various polygonal shaped) bolts/fasteners. In some examples, the shape of the features 400 is independent of the cross-section of the bolt 110. Regardless, the features 400 may define positions 402 that are at least semi-circular in shape as illustrated in FIGS. 4A and 4B, or the features 400 may be triangular shaped, square/rectangular shaped, etc. Also, while the features are illustrated on an upper side of the slot, the features may instead be positioned on an opposite lower side of the slot, or on both the upper and lower sides of the slots.

Here, the features 400 may be configured to impede travel of the bolt 110 within the channels 344,346 along the axis X, thereby inhibiting relative movement along the axis X between the transmission-mounting sub-assembly 200 and the frame-mounting sub-assembly 300. In these examples, to off-set the transmission-mounting sub-assembly 200 relative to the frame-mounting sub-assembly 300, forward or rearward along the axis X, the bolt 110 may be removed such that the transmission-mounting sub-assembly 200 and the frame-mounting sub-assembly 300 are no longer constrained together, after which the transmission-mounting sub-assembly 200 and the frame-mounting sub-assembly 300 may be off-set from each other along the axis X and the bolt 110 may be reinserted into a discrete position 402. In these examples, the features 400 need not impede or inhibit relative rotation about the axis A between the transmission-mounting sub-assembly 200 and the frame-mounting sub-assembly 300; though, such relative rotation may be limited by tightening together the transmission-mounting sub-assembly 200 and the frame-mounting sub-assembly 300 by applying a certain amount of torque to the bolt 110.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

The use of directional terms such as above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A transmission mount assembly, comprising:
a transmission-mounting portion comprising a plate and a tube provided on a bottom surface of the plate, the tube having a bore for receiving a fastener;
a frame-mounting portion comprising a bracket having a pair of sidewalls between which the tube is provided, the sidewalls extending from an inner surface of the frame-mounting portion and each having a corresponding channel for receiving the fastener, the transmission-mounting portion being movably connected to the frame-mounting portion when the fastener is extended through the channels and the bore, wherein each channel includes features corresponding with the features of the opposite channel and configured to retain the fastener and, thereby the tube, at a selected position along a length of the corresponding channels.

2. The transmission mount assembly of claim 1, wherein the features comprise a series of serrations.

3. The transmission mount assembly of claim 1, wherein the features are configured to inhibit misalignment and establish a positive lock between the frame-mounting portion and the transmission-mounting portion.

4. The transmission mount assembly of claim 1, wherein the transmission-mounting portion is adjustable within the channels of the frame-mounting portion to account for misalignment there-between.

5. The transmission mount assembly of claim 1, wherein the tube is coupled to the plate via one or more plugs.

6. The transmission mount assembly of claim 1, wherein the plate includes a pair of beveled corners adjacent to a front edge of the plate.

7. The transmission mount assembly of claim 1, wherein the tube includes a first end positionable proximate to an inner surface of a first of the sidewalls and a second end positionable proximate to an inner surface of a second of the sidewalls, and the transmission mount assembly further comprises a first bushing provided between the first end of the tube and the first sidewall and a second bushing provided between the second end of the tube and the second sidewall.

8. The transmission mount assembly of claim 1, wherein the transmission-mounting portion is rotatable relative to the frame-mounting portion about an axis defined by the fastener.

9. The transmission mount assembly of claim 1, wherein the transmission-mounting portion is slidable relative to the frame-mounting portion in a plane defined along a length of the corresponding channels.

10. The transmission mount assembly of claim 1, wherein the transmission-mounting portion and the frame-mounting portion are movable relative to each other about an axis defined by the fastener and/or in a plane defined along a length of the corresponding channels.

11. The transmission mount assembly of claim 1, wherein the corresponding channels each have a lower edge and an upper edge, the lower edge corresponding with the inner surface of the frame-mounting portion and the upper edge being disposed opposite the lower edge, and wherein the features are provided on a lower edge of each of the corresponding channels.

12. The transmission mount assembly of claim 1, wherein the corresponding channels each have a lower edge and an upper edge, the lower edge corresponding with the inner surface of the frame-mounting portion and the upper edge being disposed opposite the lower edge, and wherein the features are provided on an upper edge of each of the corresponding channels.

13. The transmission mount assembly of claim 1, wherein the corresponding channels each have a lower edge and an upper edge, the lower edge corresponding with the inner surface of the frame-mounting portion and the upper edge being disposed opposite the lower edge, and wherein the features are provided on both an upper edge and lower edge of each of the corresponding channels.

* * * * *